United States Patent
Padmanabh et al.

(10) Patent No.: US 8,588,192 B2
(45) Date of Patent: Nov. 19, 2013

(54) SYSTEM AND METHOD FOR FORMING APPLICATION DEPENDENT DYNAMIC DATA PACKET IN WIRELESS SENSOR NETWORKS

(75) Inventors: Kumar Padmanabh, Gorakhpur (IN); Puneet Gupta, Bangalore (IN); Sougata Sen, Bangalore (IN)

(73) Assignee: Infosys Limited (IN)

( * ) Notice: Subject to any disclaimer, the term of this patent is extended or adjusted under 35 U.S.C. 154(b) by 943 days.

(21) Appl. No.: 12/694,547

(22) Filed: Jan. 27, 2010

(65) Prior Publication Data
US 2011/0182232 A1    Jul. 28, 2011

(51) Int. Cl.
*H04W 4/00* (2009.01)
(52) U.S. Cl.
USPC ........... 370/338; 370/230; 370/235; 370/465; 340/853.1; 340/870.01; 340/901
(58) Field of Classification Search
None
See application file for complete search history.

(56) References Cited

U.S. PATENT DOCUMENTS

| | | | |
|---|---|---|---|
| 5,564,285 A * | 10/1996 | Jurewicz et al. | 62/127 |
| 2007/0210916 A1* | 9/2007 | Ogushi et al. | 340/531 |
| 2008/0307075 A1* | 12/2008 | Urano et al. | 709/220 |
| 2010/0008286 A1* | 1/2010 | Abedi | 370/315 |
| 2010/0302037 A1* | 12/2010 | Schnell et al. | 340/572.1 |

OTHER PUBLICATIONS

Schnell et al., Apparatus and Method for Tunneling Data in RFID Communications, May 29, 2009, pp. 1-46.*

* cited by examiner

*Primary Examiner* — Ian N Moore
*Assistant Examiner* — Brian T Le
(74) *Attorney, Agent, or Firm* — Lerner, David, Littenberg, Krumholz & Mentlik, LLP

(57) ABSTRACT

A system and method for forming application dependent dynamic data packet format in a wireless sensor network is provided. The system comprises one or more sensor nodes, wherein each sensor node comprises one or more sensors for sensing physical events. Each sensor is defined as an active or an inactive sensor based upon the application requirement. The system also comprises one or more processing units for converting the physical events sensed by the active sensors to corresponding sensed data in digital format and forming dynamic length data packets comprising the sensed data and a sensor identifier field for conveying the identities of the active sensors.

6 Claims, 4 Drawing Sheets

| Start bit | Sensor identifier | Header | Sensor data | CRC | End bit |
|---|---|---|---|---|---|

FIG. 3

| S1 | S2 | S3 | S4 | S5 | S6 | S7 | | S16 |
|---|---|---|---|---|---|---|---|---|
| 0 | 1 | 0 | 0 | 1 | 1 | | | 0 |

FIG. 4

SYSTEM AND METHOD FOR FORMING APPLICATION DEPENDENT DYNAMIC DATA PACKET IN WIRELESS SENSOR NETWORKS

BACKGROUND OF THE INVENTION

The present invention is directed towards optimizing lengths of data packets in wireless sensor networks in order to minimize energy and memory usage. More particularly, the present invention provides a system and method for forming application dependent dynamic data packets for use in wireless sensor networks.

A wireless sensor network (WSN) is a wireless network comprising a mesh of sensor nodes also termed as motes. Each sensor node is equipped with one or more sensors as well as a radio transceiver or other wireless communications device, a small processing unit, and an energy source, usually a battery. The sensor nodes are typically used to monitor physical or environmental conditions, such as temperature, sound, vibration, pressure, motion or pollutants, at different locations. In its early stages of development a wireless sensor network was used only in military applications such as battlefield surveillance. However, in present times wireless sensor networks are used in a multitude of civilian application areas, such as environment and habitat monitoring, healthcare applications, home automation, and traffic control. Specific applications for WSNs include habitat monitoring, object tracking, nuclear reactor control, fire detection, and traffic monitoring. In recent times WSNs have been successfully deployed in retail stores, industrial automation applications, building automation applications, asset tracking and supply chain management applications. In a typical application, a WSN is employed in an area for collecting data via its sensor nodes.

In a typical WSN a mesh network of sensor nodes are connected to a base station. An individual sensor node is connected to the outside world via the base station. Further, a user can control any particular sensor node by using the base station. Thus a base station acts as a gateway for all communication between a user and a sensor node. The base station also acts as a computational platform for aggregating/processing the data collected by each sensor node and presenting the processed data to an end user. Each sensor employed in a sensor node senses a physical event. The sensed information is converted into digital data which is routed to the base station in the form of data packets. Typically the formation of data packets and their routing is carried out by the processing unit available at the sensor nodes.

In most WSNs data packets having a fixed/predetermined length are used, wherein a typical data packet consists of a start bit, an optional header field, a fixed length payload field, an error correction bit and an end bit. In various cases, for a given application the data sensed by only some of the sensors available in a sensor node is required to be routed. However, while using a fixed length data packet format, data sensed by all the sensors present in the sensor node is included in the data packet. This leads to redundant information being processed and routed by the processing unit.

Sensor nodes are usually very small in size and it is desirable to reduce their sizes still further. Hence, resources such as power/energy, memory, computational speed and bandwidth are available in constrained magnitudes. Processing and routing of redundant information leads to unnecessary drain on the limited resources available with a sensor node.

Consequently, there is need for a system and a method for optimizing resource usage in a sensor node. Further, there is a need for a system and method of using dynamic length data packets for routing only the required information, and eliminating unnecessary information, without adding to the processing complexity. Dynamic length data packet formats would enable conserving power and memory available to a processing unit in a sensor node.

BRIEF SUMMARY OF THE INVENTION

A system for forming application dependent dynamic data packet in a wireless sensor network is provided. The system comprises one or more sensor nodes, wherein each sensor node comprises one or more sensors for sensing physical events. Each sensor is defined as an active or an inactive sensor based upon application of the wireless sensor network. The system also comprises one or more processing units for converting the physical events sensed by the active sensors to corresponding sensed data represented in digital format and forming dynamic length data packets comprising the sensed data and a sensor identifier field for conveying the identities of the active sensors. In an embodiment of the present invention, the active sensors are powered and the inactive sensors are not powered. In various embodiments of the present invention, the sensed data may be represented by using any digital format known in the art such as binary, hexadecimal, etc.

In an embodiment of the present invention, the system further comprises one or more communication devices for transmitting the dynamic length data packets to one or more nodes in the wireless sensor network, and a base station for receiving the sensed data from the one or more sensor nodes in the wireless sensor network, and transmitting the same to a predefined destination.

The present invention also teaches a method for providing an application dependent dynamic data packet format in a wireless sensor network comprising one or more sensor nodes, each sensor node comprising one or more sensors and one or more processing units. The method comprises the steps of: predefining active sensors in a sensor node based on an application of the wireless sensor network; powering the active sensors; sensing physical events by using the active sensors; processing the sensed physical events to obtain sensed data in digital format; and forming a dynamic length data packet comprising the sensed data obtained from the active sensors and a sensor identifier field for conveying the identities of the active sensors; the length of the data packet depending upon the number and type of active sensors. In an embodiment of the present invention, the sensor identifier field is constructed by assigning a 'one' corresponding to each of the active sensors and a 'zero' corresponding to each of the inactive sensors.

The present invention further provides an application dependent dynamic length data packet format for conveying data in wireless sensor networks comprising one or more sensor nodes, each sensor node comprising one or more sensors for sensing physical events, each sensor being defined as an active or an inactive sensor based upon an application of the wireless sensor network. The data packet format comprises: a sensor identifier field for conveying the identities of the active sensors in a sensor node, the sensor identifier field being constructed by assigning a 'one' corresponding to each of the active sensors and a 'zero' corresponding to each of the inactive sensors; and a sensor data field comprising physical events sensed by the active sensors in a sensor node, the sensed physical events being represented in a digital format; the length of the data packet varying with the number and type of active sensors defined in the sensor node.

BRIEF DESCRIPTION OF THE DRAWINGS

The present invention is described by way of embodiments illustrated in the accompanying drawings wherein:

FIG. 3 illustrates an exemplary data packet format; and

FIG. 4 illustrates a method of constructing a sensor identifier field.

DETAILED DESCRIPTION

A system and a method for forming application dependent dynamic data packet for use in wireless sensor networks are described herein. Data packets of dynamic lengths, comprising data sensed by one or more sensors corresponding to a particular application are formed, thereby optimizing resource consumption with respect to a sensor node. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
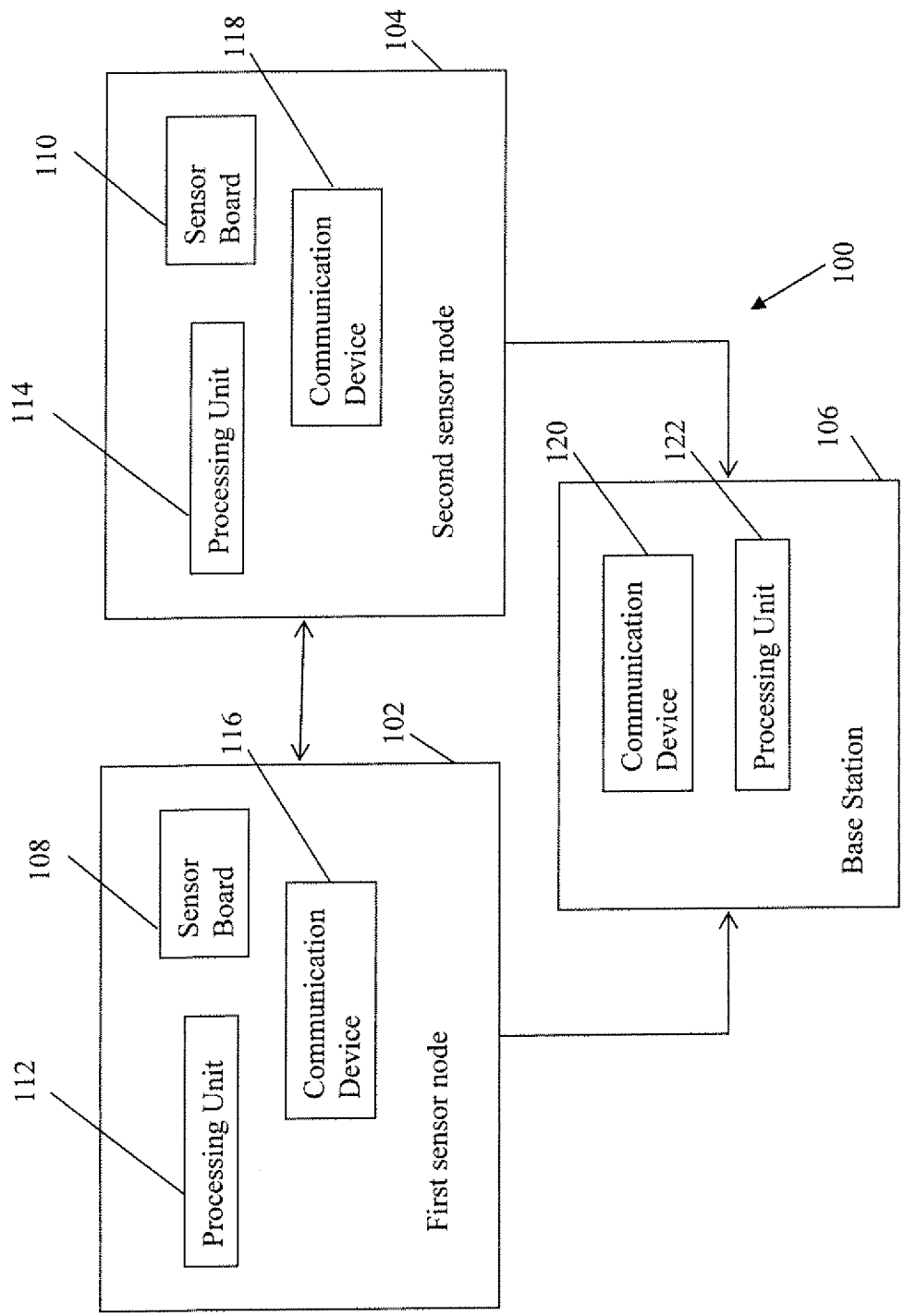
FIG. 1 is a block diagram depicting a system for forming application dependent dynamic data packet for use in wireless sensor networks.

FIG. 1 is a block diagram depicting a system for forming application dependent dynamic data packet for use in wireless sensor networks. System 100 comprises a first sensor node 102, a second sensor node 104 and a base station 106. Each sensor node comprises sensor boards 108 and 110 respectively, processing units 112 and 114 respectively and wireless communication devices 116 and 118 respectively. Base station 106 comprises a communication device 120 and a processing unit 122.

In various embodiments of the present invention, system 100 comprises a plurality of sensor nodes connected to one or more base stations. Sensor nodes 102, 104 are powered via any energy source. For example, sensor nodes 102, 104 may be battery powered or line powered. Sensor boards 108, 110 comprise one or more sensors for sensing physical events. Sensors present on sensor board 108, 110 convert the sensed physical events into electrical signals. The one or more sensors are of any kind commonly known in the art, comprising general purpose sensors or sensors designed for a specific use. In an embodiment of the present invention, sensor boards 108, 110 are provided with a hardware interface for attaching one or more external sensors.

In various embodiments of the present invention, processing units 112 and 114 are microprocessor or microcontrollers commonly known in the art. Processing units 112, 114 collect the physical events sensed by the one or more sensors present on sensor boards 108, 110, convert the collected electrical data into digital data and route the digital data to base station 106 via wireless communication devices 116 and 118 respectively. In various embodiments of the present invention, processing units 112, 114 collect sensed events only from one or more predefined active sensors present on sensor boards 108, 110 respectively. The one or more sensors present on sensor boards 108, 110 are predefined as active or inactive based on an application for which the sensed data is used. In an embodiment of the present invention, only the predefined active sensors are powered. In various embodiments of the present invention, processing units 112, 114 convert the collected respective electrical data into equivalent digital data and incorporate them in packets of variable lengths depending upon the number and type of active sensors used. In an embodiment of the present invention, processing units 112, 114 intelligently determine route information from one sensor node to another, thereby acting as routers to form a mesh network of sensor nodes.

Wireless communication devices 116 and 118 transmit the data packets comprising the sensed physical events to base station 106. In an embodiment of the present invention, wireless communication devices 116 and 118 also communicate with one or more nodes in a mesh network. Base station 106 conveys the physical events sensed by sensor nodes 102, 104 to an end user via a data distribution network. Communication device 120 receives data packets from sensor nodes 102, 104 and transmits them to a predefined destination. In an embodiment of the present invention processing unit 122 processes the received data packets to extract predefined information which is then transmitted by communication device 120.

Figure 2:
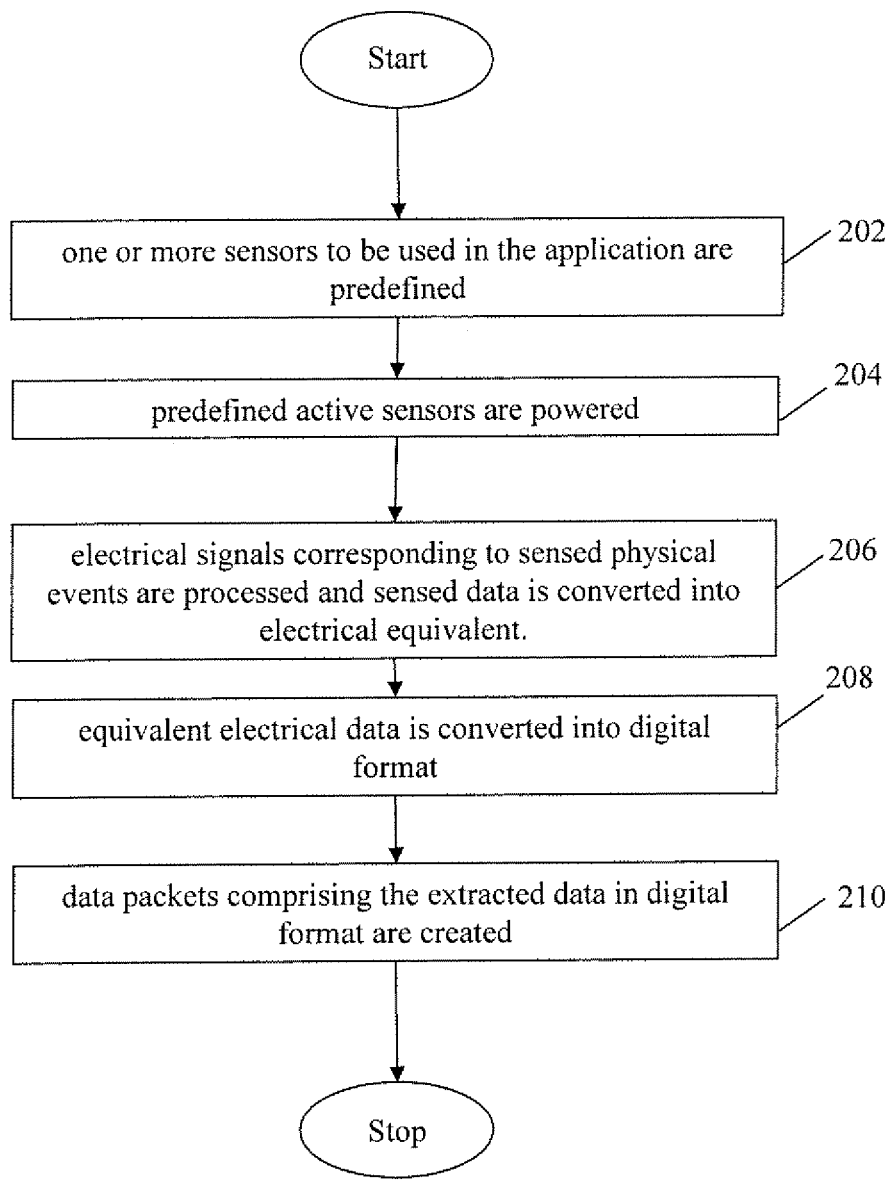
FIG. 2 is a flowchart illustrating a method for forming application dependent dynamic data packet for use in wireless sensor networks.

FIG. 2 is a flowchart illustrating a method for forming application dependent dynamic data packet for use in wireless sensor networks. At step 202 active sensors are predefined based on the application for which the sensors are being used. For example, for a fire detection application, on a sensor node comprising five sensors one each for sensing temperature, light, pressure, motion and acceleration, only two of the sensors which detect temperature and light are predefined as active and the remaining three as inactive. Hence, for any given application only some of the total number of sensors present on a sensor node are predefined as active.

At step 204 the predefined active sensors are powered. In an embodiment of the present invention a processing unit provided on a sensor node powers the predefined active sensors and disables the inactive sensors present on the sensor board by using application software running in the sensor nodes. The powered sensors sense the corresponding physical events and generate corresponding electrical signals.

At step 106 electrical signals corresponding to sensed physical events are processed and sensed data is extracted. At step 108 the extracted data is converted into digital format. At step 110 data packets comprising the extracted data in digital format are created. In various embodiments of the present invention, a data packet comprises a header field, a sensor identifier field and a sensor data field.

FIG. 3 illustrates an exemplary data packet format. Start bit 302 signifies beginning of the data packet. Sensor identifier field 304 conveys the identities of the active sensors on the corresponding sensor board. A method of creating sensor identifier field 304 in accordance with an embodiment of the present invention is described with reference to FIG. 4. Header field 306 comprises a prefix and suffix which are required for establishing communication with other sensor nodes and base station in a wireless sensor network. Sensor data field 308 comprises data corresponding to the active sensors and is of variable length. The length of sensor data field varies with changes in the number and type of active sensors. CRC bit 310 is a cyclic redundancy check bit used for error correction as is well known in the art. End bit 312 signifies the end of the data packet.

Figure 4:
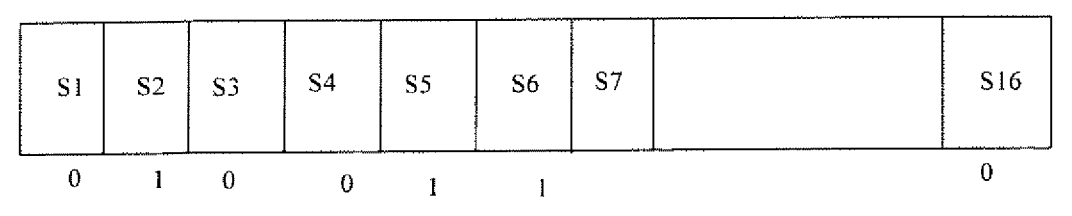

FIG. 4 illustrates a method of creating a sensor identifier field for describing the presence or absence of data corresponding to one or more sensors on a sensor board. The length of the sensor identifier field is dependent on the number of sensors provided on a sensor board and digital representation of the electrical data. If the total number of sensors on the sensor board is less than or equal to sixteen and a hexadecimal format is used, then a four bit hexadecimal equivalent of sensor identifier field is used. If a binary format is used then the sensor identifier field is represented using sixteen bits. If a hexadecimal format is used then the sensor identifier field is represented using four bits. Similarly, if the total number of sensors on the sensor board is greater than sixteen but less than or equal to thirty two, a five bits hexadecimal and thirty two bits binary equivalent of sensor identifier field is used. As illustrated in FIG. 4, active sensors are marked as one and inactive sensors are marked as zero in a serial order. The equivalent hexadecimal/binary number is obtained and recorded corresponding to the sensor identifier field.

In an exemplary embodiment of the present invention, a sensor node connected in a wireless sensor network comprises a sensor board provided with eleven sensors, one each for sensing the following parameters: pressure, temperature, light, humidity, smoke, vibration, moisture, motion, acceleration, touch, and resistance One of the applications for which the sensor node is used is a building automation system which performs the following functions:
  Generates a fire alarm on detecting smoke
  Optimizes electricity consumption by switching off the lights in building areas where no movement is detected
  Regulates temperature in the building by switching off or switching on air conditioners depending upon detected ambient temperature Hence, for the building automation system application, only four of the sensors for detecting the following parameters are used:
  light, temperature, smoke and motion The four required sensors are marked as active sensors and the remaining seven sensors which are not required for the building automation system application are marked as inactive sensors. Since the total number of sensors provided on the sensor board is less than sixteen, a four bit hexadecimal sensor identifier field is used in a data packet which is formed for transmitting data sensed by the four active sensors.

If all eleven sensors are treated as active sensors, the sensor identifier field will be defined as:

| | | | | | | | | | | | | | | | |
|---|---|---|---|---|---|---|---|---|---|---|---|---|---|---|---|
| 0 | 0 | 0 | 0 | 1 | 1 | 1 | 1 | 1 | 1 | 1 | 1 | 1 | 1 | 1 | 1 |

Therefore, the four bit hexadecimal sensor identifier would be '07FF'.

However, if only four required sensors are treated as active sensors, the sensor identifier field will be defined as:

| | | | | | | | | | | | | | | | |
|---|---|---|---|---|---|---|---|---|---|---|---|---|---|---|---|
| 0 | 0 | 0 | 0 | 0 | 1 | 1 | 0 | 1 | 0 | 0 | 1 | 0 | 0 | 0 | |

Therefore, the hexadecimal sensor identifier would be '0348'.

Hence, a data packet for conveying data sensed by the four sensors required for the building automation system application, in accordance with the present invention would comprise the following fields:

| Start Bit | Header | Sensor identifier 0348 | Light | Temp | Smoke | Motion | End Bit |
|---|---|---|---|---|---|---|---|

Thus, by using a sensor identifier field of fixed length and predefining sensors as active or inactive based on a corresponding application, the length of the data packet is considerably reduced. Only the digital data corresponding to the four active sensors is included in the data packet, whereas the data corresponding to the seven inactive sensors is not included, thereby reducing the length of the data packet which requires to be transmitted.

Therefore the present invention provides a system, and a method for forming application dependent dynamic data packet for use in wireless sensor networks. The system and method of the present invention may be employed in wireless sensor network applications. Hence, the system and method of the present invention enables optimization of resources such as power and memory which are severely limited in a wireless sensor node. Further, the dynamic data packet format, proposed in the present invention, eliminates redundant information, such as fields corresponding to inactive sensors, from being processed or transmitted.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A system for forming application dependent dynamic data packet in a wireless sensor network, the system comprising one or more sensor nodes, each sensor node comprising:
  a. one or more sensors for sensing physical events, each sensor being defined as an active or an inactive sensor based upon an application of the wireless sensor network; and
  b. one or more processing units for converting the physical events sensed by the active sensors to corresponding sensed data in digital format and forming dynamic length data packets, the dynamic length data packets comprising the sensed data and a sensor identifier field for conveying identities of the active sensors;
  wherein, length of the dynamic length data packets depends upon number and type of the active sensors and the sensor identifier field is constructed by assigning a 'one' corresponding to each of the active sensors and a 'zero' corresponding to each of the inactive sensors.

2. The system as claimed in claim 1 further comprising one or more communication devices for transmitting the dynamic length data packets to one or more nodes in the wireless sensor network.

3. The system as claimed in claim 1 further comprising a base station for receiving the sensed data from the one or more sensor nodes in the wireless sensor network, and transmitting the sensed data to a predefined destination.

4. The system as claimed in claim 1 wherein the active sensors are powered and the inactive sensors are not powered.

5. A method for forming application dependent dynamic data packet in a wireless sensor network comprising one or more sensor nodes, each sensor node comprising one or more sensors and one or more processing units, the method comprising the steps of:

a. predefining active sensors and inactive sensors in a sensor node based on an application of the wireless sensor network;
b. powering the active sensors;
c. sensing physical events by using the active sensors;
d. processing the sensed physical events to obtain sensed data in digital format; and
e. forming a dynamic length data packet comprising the sensed data obtained from the active sensors and a sensor identifier field for conveying identities of the active sensors;

wherein, length of the dynamic length data packet depends upon number and type of the active sensors, and the sensor identifier field is constructed by assigning a 'one' corresponding to each of the active sensors and a 'zero' corresponding to each of the inactive sensors.

6. A system for conveying data in wireless sensor networks, the system comprising:
one or more sensor nodes, each sensor node comprising one or more sensors for sensing physical events, each sensor being defined as an active or an inactive sensor based upon an application of the wireless sensor network, and a processor configured to provide a data packet formatted according to an application dependent dynamic length data packet format, wherein the application dependent dynamic length data packet format includes:

a. a sensor identifier field for conveying identities of the active sensors in the one or more sensor nodes, wherein the sensor identifier field is constructed by assigning a 'one' corresponding to each of the active sensors and a 'zero' corresponding to each of the inactive sensors; and
b. a sensor data field comprising physical events sensed by the active sensors in the one or more sensor nodes, the sensed physical events being represented in a digital format;

wherein, a length of the application dependent dynamic data packet varies with a number and type of active sensors defined in the one or more sensor nodes.

* * * * *